June 21, 1955 B. R. STRICKLAND Re. 24,025
DEASPHALTING OPERATION
Original Filed Feb. 27, 1952
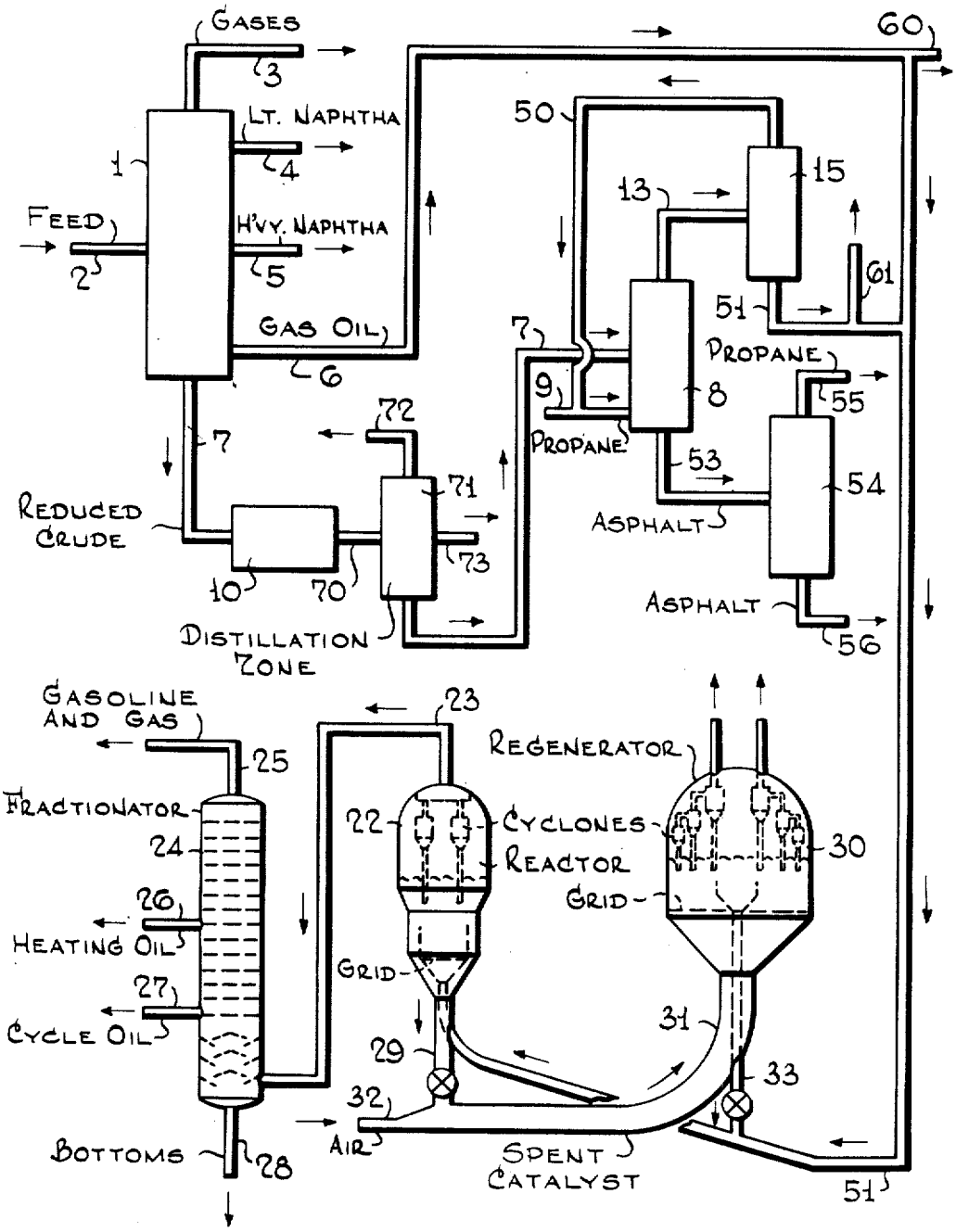
Barney R. Strickland Inventor
By W. O. Hilman Attorney United States Patent Office Re. 24,025
Reissued June 21, 1955

24,025

DEASPHALTING OPERATION

Barney R. Strickland, Westfield, N. J., assignor to Esso Research and Engineering Company, a corporation of Delaware Original No. 2,696,458, dated December 7, 1954, Serial No. 273,712, February 27, 1952. Application for reissue March 22, 1955, Serial No. 496,090

3 Claims. (Cl. 196—14.11)

Matter enclosed in heavy brackets [ ] appears in the original patent but forms no part of this reissue specification; matter printed in italics indicates the additions made by reissue.

The present invention is broadly concerned with an improved process for the removal of asphaltic constituents from residual oils whereby increased yields of higher quality deasphalted oils are obtained. The present invention is more particularly concerned with an improved process for the preparation of satisfactory feed stocks for cracking operations, whereby higher quality hydrocarbon products boiling in the gasoline and heating oil boiling ranges are obtained by an efficient operation. In accordance with the present invention, a residual oil is mildly thermally cracked or visbroken under controlled conditions. Low boiling hydrocarbon constituents, as for example hydrocarbons boiling in the motor fuel and heating oil boiling ranges are removed from the visbroken residuum. The residuum is then deasphalted. The resulting deasphalted product is utilized as a high quality fuel or employed in the catalytic cracking operation.

It is well known in the art to treat mineral oils by various processes in order to remove undesirable high boiling and asphaltic constituents from these oils. For example, it is known to employ light hydrocarbon solvents, as for example, hydrocarbons such as propane and butane, in order to remove undesirable constituents, such as asphaltic constituents, therefrom. In these operations various temperatures and pressures are employed, as well as various solvent to oil ratios. It is also known in the art to use various other processes for the removal of carbon-forming and ash-forming constituents therefrom in order to prepare high quality lube and fuel oils. Other processes have also generally been directed toward the preparation of satisfactory high boiling feed stocks for a cracking operation, particularly for a fluidized solids catalytic cracking operation.

It has now been discovered that undesirable high boiling constituents may be efficiently removed from feed stocks boiling in the reduced crude boiling range, providing the reduced crude or residual oil is mildly visbroken and then treated with a deasphalting solvent, as for example, propane or butane. The process of the present invention may be readily understood by reference to the drawing illustrating one embodiment of the same.

Referring specifically to the drawing, a feed oil, as for example a West Texas crude, is introduced into distillation zone 1 by means of feed line 2. Temperature and pressure conditions in zone 1 are adjusted to secure the desired fractionation of the crude oil. Low boiling hydrocarbon gases are removed overhead from zone 1 by means of line 3; a hydrocarbon fraction boiling in the light naphtha range is removed by means of line 4; a hydrocarbon fraction boiling in the heavy naphtha range is removed by means of line 5, while a gas oil fraction is removed by means of line 6. A fraction boiling in the reduced crude boiling range, as for example in the range above about 600° to 700° F., preferably boiling in the range above about 1000° F., is segregated as a bottoms fraction by means of line 7. It is to be understood that zone 1 may comprise any suitable number and arrangement of distillation zones or stages.

In accordance with the present invention, the high boiling reduced crude is passed into visbreaking zone 10 wherein the oil is subjected to temperature, pressure and time conditions to mildly reduce the viscosity as hereinafter described. The visbroken product is withdrawn from visbreaking zone 10 by means of line 70 and passed into distillation zone 71. Temperature and pressure conditions in zone 71 are adapted to segregate hydrocarbon constituents boiling below about 650° F. from the residuum. Hydrocarbon constituents boiling in the motor fuel boiling range and below are removed from zone 71 by means of line 72 while hydrocarbon constituents boiling in the heating oil boiling range are removed from zone 71 by means of line 73. The visbroken residuum boiling above about 650° F., preferably boiling above about 1000° F. is withdrawn from the bottom of distillation zone 71 by means of line 74 and introduced into a deasphalting zone 8 wherein it is preferably countercurrently contacted with a deasphalting solvent, as for example, propane or butane or equivalent solvent which is introduced into deasphalting zone 8 by means of line 9. Temperature and pressure conditions in zone 8 are adjusted to secure the desired removal of asphaltic constituents from the residual oil. A residual oil-propane mixture is removed overhead from zone 8 by means of line 13 and introduced into a distillation zone 15. Temperature and pressure conditions in zone 15 are adjusted to remove overhead by means of line 50 propane or other solvent which is preferably recycled to zone 8.

A deasphalted residual fraction is removed from the bottom of distillation zone 15 by means of line 51 and may be combined with a portion of the gas oil stream withdrawn from zone 1 which is introduced into line 51 by means of line 52. This virgin gas oil may be removed from the system if desired by means of line 60. The deasphalted oil may be withdrawn from the system by means of line 61 and utilized as a high quality fuel.

The asphaltic constituents are removed from zone 8 by means of line 53 and passed to a distillation zone 54, wherein a separation is made between the propane and the asphaltic constituents. The propane or other solvent is removed overhead by means of line 55 and preferably recycled to zone 8 while the asphaltic constituents are removed as a bottoms by means of line 56 and further refined or handled as desired. It is to be understood that zones 8, 15, 10, 71 and 54 may comprise any suitable number and arrangement of stages.

The present invention is broadly concerned with an improved process for the removal of undesirable high boiling constituents and asphaltic constituents from residual oils. The invention comprises utilizing in conjunction with conventional solvents, a mild visbreaking operation. The resultant deasphalted product of higher yield, as pointed out heretofore, is suitable for the production of high quality fuel oils, and is particularly adapted as a feed stock to a fluid catalytic cracking operation.

The deasphalting solvent may comprise low boiling hydrocarbons, as for example, those containing from 2 to 5 carbon atoms in the molecule, or mixtures thereof. Particularly desirable solvents comprise propane and butane. The amount of solvent used per volume of oil may vary from 2 to 10, preferably in the range from 4 to 6 volumes of solvent per volume of oil. When using propane as a solvent, the mixture is generally heated to a temperature in the range from about 110° F. to 180° F., preferably to a temperature in the range from 120° to 160° F. When using butane as a solvent, the temperature may be in the range of 150° to 350° F., preferably in the range of 200° to 300° F. If a mixture of propane and butane is used, intermediate temperatures to those used with the two materials separately are employed.

The deasphalting operation may comprise a batch operation or a countercurrent treating operation wherein the oil is introduced into the top of the tower, the propane or other solvent is introduced into the bottom of the tower, and wherein deasphalted oil is removed from the top of the tower and asphaltic constituents from the bottom of the tower. In conducting an operation of this character, a temperature gradient is preferably maintained throughout the tower.

As heretofore disclosed, the deasphalted residual fraction withdrawn from zone 15 may be utilized as a fuel or in accordance with a specific adaptation of the present invention, may be used as such or combined with a portion of the gas oil fraction segregated in zone 1 and introduced into a fluid catalytic cracking operation.

The fluid catalytic cracking operation comprises three sections: cracking, regeneration, and fractionation. The cracking reaction takes place continuously in one reactor, the spent catalyst being removed continuously for regeneration in a separate vessel, from which it is returned to the cracking vessel. Continuity of flow of catalyst as well as of oil is thus accomplished, and the characteristic features of fixed-bed designs involving the intermittent shifting of reactors through cracking, purging, and regeneration cycles are eliminated.

Regenerated catalyst is withdrawn from the regenerator and flows by gravity down a standpipe, wherein a sufficiently high pressure head is built up on the catalyst to allow its injection into the fresh liquid oil stream. The resulting mixture of oil and catalyst flows into the reaction vessel, in which gas velocity is intentionally low, so that a high concentration of catalyst will result. The cracking that takes place results in carbon deposition on the catalyst, requiring regeneration of the catalyst. The cracked product oil vapors are withdrawn from the top of the reactor after passing through cyclone separators to free them of any entrained catalyst particles, while the spent catalyst is withdrawn from the bottom of the reactor and is injected into a stream of undiluted air which carries the catalyst into the regeneration vessel. The products of combustion resulting from the regeneration of the catalyst leave the top of this vessel and pass through a series of cyclones where the bulk of the entrained catalyst is recovered. The regenerated catalyst is withdrawn from the bottom of the vessel to complete its cycle.

Again referring specifically to the drawing, in accordance with a specific preferred adaptation of the present invention, the treated oil removed by means of line 51 is introduced into a catalytic cracking zone 22.

Temperature and pressure conditions in cracking zone 22 are adjusted to secure the desired conversion of the feed oil. Cracked products are removed overhead from zone 22 by means of line 23 and passed into a fractionation zone 24. Temperature and pressure conditions in fractionation zone 24 are adjusted to remove overhead by means of line 25 hydrocarbon constituents boiling in the gasoline and lower boiling ranges. This stream is passed to a stabilizing unit where a gasoline fraction of the desired volatility is segregated. A heating oil fraction is removed by means of line 26 while a fraction boiling in the light cycle oil boiling range is removed by means of line 27. A bottoms fraction or heavy cycle oil is removed by means of line 28 and handled as desired. Spent catalyst is removed from the bottom of zone 22 by means of line 29 and passed into a regeneration zone 30 by means of line 31. Sufficient air is introduced into the system by means of line 32. Regenerated catalyst is removed from the bottom of zone 30 by means of line 33 and passed to the reactor along with the feed by means of line 51.

The invention is broadly concerned with the removal of undesirable materials from petroleum oils, particularly from petroleum oils boiling in the reduced crude boiling range. Petroleum oils treated in accordance with the present invention are particularly adapted as feed stocks for a catalytic cracking reaction. Although the invention may be adapted for the treatment of mineral oils boiling over wide ranges as pointed out above, it is particularly adapted for the treatment of oils boiling above about 860° F., preferably boiling above about 1000° F.

As discussed above, the invention is particularly concerned with an improved operation which comprises the treatment of a reduced crude by visbreaking followed by deasphalting the same. The deasphalted residuum comprises an excellent feed stream for a catalytic cracking unit. It is well known in the art to produce cracked naphthas by a fluidized solids catalytic operation wherein the cracked product comprises constituents boiling in the motor fuel boiling range, as for example, below about 430° F. The cracked product also comprises normally gaseous constituents, as for example, those containing three carbon atoms and less in the molecule. The fluidized solids technique for processing feed fractions, as for example, gas oils, heavy residuums and other feed stocks for the production of hydrocarbon fractions boiling in the motor fuel boiling range is a conventional one such as described in conjunction with the drawing.

As pointed out heretofore, the system of a fluidized solids technique comprises a reaction zone and a regeneration zone, employed in conjunction with a fractionation zone. The reactor and the catalyst regenerator are arranged at approximately an even level. The operation of the reaction zone and the regeneration zone is conventional, which preferably is as follows:

An overflow pan is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° to 650° F. in exchangers in heat exchange with regenerator flue gases which are removed overhead from the regeneration zone, or with cracked products. The heated feed stream is withdrawn from the exchangers and introduced into the reactor. The seal leg is usually sufficiently below the point of feed oil injection to prevent oil vapors from backing into the regenerator in case of normal surges. Since there is no restriction in the overflow line from the regenerator, satisfactory catalyst flow will occur as long as the catalyst level in the reactor is slightly below the catalyst level in the regenerator when vessels are carried at about the same pressure. Spent catalyst from the reactor flows through a second U-shaped seal leg from the bottom of the reactor into the bottom of the regenerator. The rate of catalyst flow is controlled by injecting some of the air into catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 feet per second. However, the superficial velocity of the upflowing gases may vary from about 1–5 and higher. Catalyst losses are minimized and substantially prevented in the reactor by the use of multiple stages of cyclone separators. The regeneration zone is provided with cyclone separators. These cyclone separators are usually from 2 to 3 and more stages.

Distributing grids may be employed in the reaction and regeneration zones. Operating temperatures and pressures may vary appreciably depending upon the feed stocks being processed and upon the products desired. Operating temperatures are, for example, in the range from about 800° to 1000° F., preferably about 850°–950° F., in the reaction zone. Elevated pressures may be employed, but in general pressures below 100 lbs. per sq. in. gauge are utilized. Pressures generally in the range from 1 to 30 lbs. per sq. in. gauge are preferred. A catalyst holdup corresponding to a space velocity of 0.5 to 20 weights per hour of feed per weight of catalyst is utilized. A preferred ratio is 1 to 3. Catalyst to oil ratios of about 3 to 10, preferably about 6 to 8 by weight are used.

The catalytic materials used in the fluidized catalyst cracking operation, in accordance with the present invention, are conventional cracking catalysts. These catalysts are oxides of metals of groups II, III, IV and V of the periodic table. A preferred catalyst comprises silica-alumina wherein the weight per cent of the alumina is in the range from about 5 to 20%. Another preferred catalyst comprises silica-magnesia where the weight per cent of the magnesia is about 5% to 20%. These catalysts may also contain a third constituent, as for example, $ThO_2$, $WO_3$, BeO, $Bi_2O_3$, CdO, $UO_3$, $B_2O_3$, $SnO_2$, MnO, $Cr_2O_3$, CaO, $Tl_2O_3$, and $Ce_2O_3$ present in the concentration from 0.05% to 0.5%. The size of the catalyst particles is usually below about 200 microns. Usually at least 50% of the catalyst has a micron size in the range from about 20–80. Under these conditions with the superficial velocities as given, a fluidized bed is maintained wherein the lower section of the reactor, a dense catalyst phase exists while in the upper area of the reactor a dispersed phase exists.

The above described operation, as pointed out, has not been entirely satisfactory for cracking heavy oils such as a reduced crude due to excessive formation of carbon and ash on the catalyst. However, by mildly visbreaking reduced crude and deasphalting the same, unexpected desirable results are secured.

While the exact mechanism is not entirely understood, it is felt that the mild visbreaking operation employed as described in the present invention causes certain ash constituents in the residuums to decompose. These organic metallic ash compounds are converted to a form which can readily be removed on deasphalting. It is also felt that these residua contain constituents such as resins which function as peptizing agents which tend to hold the oil and asphaltic constituents in a single phase. The mild visbreaking operation of the present invention causes these resins to decompose, resulting in a greater yield of deasphalted oil.

On the other hand, a normal or severe visbreaking operation decreases the yields of deasphalted oil as well as impairs its quality, compared to mild visbreaking.

The mild visbreaking operation is secured by controlling various interrelated operating conditions such as feed rates, pressure, recycle rates, temperature and time. In general it is preferred that relatively low temperatures and contact times be used as compared to normal visbreaking operations. In visbreaking operations it has been known that the insoluble material in 86° naphtha readily approaches the original Conradson carbon of the feed and then levels off. One method is to control operating conditions so that a minimum conversion is attained and that the naphtha-insoluble content of the visbroken product (portion boiling above about 650° F.) approaches the Condradson carbon content of the original residuum feed. The viscosity of the product as compared to the feed should be within 50%, preferably within 25%.

The present invention may be more fully understood by the following examples illustrating the same:

EXAMPLE 1

A residual oil was visbroken in one operation to yield 5% by volume of hydrocarbons boiling within the range of butane to about 430° F. vapor temperature. In a second operation, the yield was 9%. Both visbroken products were distilled to remove gasoline and heating oil produced and the higher boiling bottoms fraction was then deasphalted. The results of these operations are shown in the following table. The residua boiled above about 650° F.

DEASPHALTING OF VIRGIN RESIDUUM AND VISBROKEN RESIDUUMS
[One-stage, using mixed butanes: 65% n-butane and 35% isobutane.]

| Material Deasphalted | Virgin Residuum | | | Visbreaker Residuum from 5% Conv. ($C_4$/430° F. Yield) | | | Visbreaker Residuum from 9% Conv. ($C_4$/430° F. Yield) | | |
|---|---|---|---|---|---|---|---|---|---|
| Deasphalting Conditions: | | | | | | | | | |
| Temperature | 200° F | | | 200° F | | | 200° F. | | |
| Solvent Treat | 600% | | | 600% | | | 600%. | | |
| Mixing Time | 30 Minutes | | | 30 Minutes | | | 30 Minutes. | | |
| Settling Time | do | | | do | | | Do. | | |
| Yields, Wt. Percent: | | | | | | | | | |
| Oil | 53 (55 Vol. Percent) | | | 68 (72 Vol. Percent) | | | 67 (71 Vol. Percent). | | |
| Asphalt | 47 | | | 32 | | | 33. | | |
| | Feed | Oil | Asphalt | Feed | Oil | Asphalt | Feed | Oil | Asphalt |
| Inspections: | | | | | | | | | |
| Specific Gravity | 1.003 | 0.957 | 1.059 | 1.005 | 0.944 | | 1.011 | 0.947 | 1.17 |
| API Gravity | 9.6 | 16.3 | | 9.3 | 18.4 | | 8.5 | 17.9 | |
| Viscosity— | | | | | | | | | |
| SSF/210° F | 990 | 60 | | 952 | 31 | | 395 | 18.4 | |
| SSF/150° F | | | | | 132 | | | | |
| SSF/122° F | | 2000 | | | 380 | | | 155 | |
| Conradson Carbon, Wt. Percent | 21 | 6.9 | | 23 | 7.2 | | 24 | 6.7 | |
| Insol. 86° Naph. (Mod.), Wt. Percent | 15 | 0.39 | 48 | 20 | 0.7 | 72 | 21 | 0.43 | 72 |
| Insol. Benzene, Wt. Percent | | | 1.8 | | | 10 | | | 13 |
| Insol. Carbon Disulfide, Wt. Percent | | | 1.1 | | | 5.7 | | | 0.61 |
| Ash, Wt. Percent | 0.18 | 0.01 | 0.75 | 0.20 | 0.0078 | 0.82 | 0.21 | 0.00 | 0.83 |
| Carbon, Wt. Percent | 87.22 | | 86.85 | | | 86.53 | | | 87.86 |
| Hydrogen, Wt. Percent | 10.82 | | 8.80 | | | 7.88 | | | 7.43 |
| Sulfur, Wt. Percent | 0.89 | | 1.22 | | | 1.64 | | | 1.67 |
| H/C Ratio, Atomic | 1.47 | | 1.21 | | | 1.09 | | | 1.01 |

VISBREAKING CONDITIONS

[Once-through coil only.]

| $C_4$/430° F. V. T. Yield, Vol. Percent | 5 | 9 |
|---|---|---|
| Coil Outlet Temperature, ° F | 860 | 920 |
| Coil Outlet Pressure, p. s. i. g | 350 | 350 |
| Feed Rate, Vol. of Oil per Hr. per Vol. Reactor Zone above 750° F | 15.0 | 15.5 |
| Visbroken Tar Yield, Vol. Percent | 95 | 90 |

From the above, it is readily apparent that the viscosity of the visbroken residuum from visbreaking to 5% gasoline yield was not substantially lower than the viscosity of the original residuum (952 vs. 990). On the other hand, the viscosity of the residuum from visbreaking at 9% conversion was appreciably lower than the viscosity of the original residuum (395 vs. 990).

It is to be noted that in both operations the yield of the deasphalted oil was increased appreciably (55 volume percent to 71–72 volume percent based on feed to deasphalting).

The yields of deasphalted oil based upon the virgin residuum in the two operations were as follows:

| Residuum Pretreatment | Visbreaking to— | | |
|---|---|---|---|
| | None | 5% Conversion | 9% Conversion |
| On Virgin Residuum: | | | |
| Weight Percent | 53 | 65 | 61 |
| Volume Percent | 55 | 68 | 64 |

It is readily apparent that the yield of deasphalted oil is appreciably greater at a 5% conversion as compared to a 9% conversion visbreaking operation.

EXAMPLE 2

Various tests were made to determine the potential carbon which the deasphalted oils would deposit on the catalyst in a fluid catalytic cracking operation under the same operating conditions. The results of these tests are as follows:

| Deasphalted Oil From— | Catalytic Carbon Wt. Percent on Feed |
|---|---|
| 5% Conversion on Residuum | 2.7 |
| 9% Conversion on Residuum | 4.7 |

It is apparent from the above that approximately 100% more carbon is formed on the catalyst when visbreaking to a 9% conversion as compared to visbreaking mildly to a 5% conversion.

As pointed out heretofore, the mild visbreaking will be a function of pressure, contact time and temperature. The operations should be so controlled that a minimum conversion is attained wherein the naphtha insoluble content of a visbroken product approaches the Conradson carbon content on the original residuum feed. Effective contact time may be expressed as a reciprocal relationship, v./hr./v., which is volume of feed oil per hour per volume of reaction zone above 750° F. If the temperature be relatively low, then the contact time is long or the v./hr./v. is relatively low, whereas if higher temperatures are employed, the v./hr./v. is higher. The following table illustrates approximate temperature-v./hr./v. relationships:

| Temperature, ° F.: | V./hr./v. |
|---|---|
| 750 | 1 |
| 800 | 3 |
| 860 | 15 |
| 900 | 50 |
| 920 | 75 |

What is claimed is:

[1. A process for the removal of asphaltic constituents from residual oils which comprises heating the residual oil at a temperature of about 750° F. to 920° F. at a feed rate of about 1–75 volumes of oil per hour per volume of the heating zone to provide a treated product characterized by conversion of no more than about 5% of hydrocarbons boiling in the range below 430° F., removing the said hydrocarbons boiling below about 430° F. by fractionation, and thereafter treating the residual oil with a deasphalting solvent under conditions to separate asphaltic constituents from the treated product providing a treated residual oil characterized by a viscosity not substantially lower than the original residual oil, and a content of insoluble material in 85° A. P. I. gravity naphtha approaching the Conradson carbon content of the original residual oil.]

[2. The process defined by claim 1 in which the said residual oil to be treated boils above about 650° F.]

[3. The process defined by claim 1 in which the said deasphalting solvent comprises a low boiling hydrocarbon solvent.]

*4. A process for the removal of asphaltic constituents from residual oils which comprises heating the residual oil at a temperature of about 750° F. to 920° F. at a feed rate of about 1–75 volumes of oil per hour per volume of the heating zone to provide a treated product characterized by conversion to no more than about 5% of hydrocarbons boiling in the range below 430° F., removing the said hydrocarbons boiling below about 430° F. by fractionation, and thereafter treating the residual oil, characterized by a viscosity not substantially lower than the original residual oil and a content of insoluble material in 86° A. P. I. gravity naphtha approaching the Conradson carbon content of the original residual oil, with a deasphalting solvent under conditions to separate asphaltic constituents from the treated product.*

*5. The process defined by claim 4 in which the said residual oil to be treated boils above about 650° F.*

*6. The process defined by claim 4 in which the said deasphalting solvent comprises a low boiling hydrocarbon solvent.*

References Cited in the file of this patent or the original patent

UNITED STATES PATENTS

| | | |
|---|---|---|
| 2,160,814 | Arveson | June 6, 1939 |
| 2,528,586 | Ford | Nov. 7, 1950 |

OTHER REFERENCES

Industrial and Engineering Chemistry, vol. 42, No. 10, October 1950, pages 2088–2095 incl. (Article by Oden et al.)